United States Patent
Li et al.

(10) Patent No.: US 11,623,210 B2
(45) Date of Patent: Apr. 11, 2023

(54) METHOD FOR PREPARING SILICATE/CARBON COMPOSITE FROM ATTAPULGITE, AND USE OF SILICATE/CARBON COMPOSITE

(71) Applicant: CHANGZHOU UNIVERSITY, Changzhou (CN)

(72) Inventors: Xiazhang Li, Zhangzhou (CN); Haiguang Zhang, Zhangzhou (CN); Xini Chu, Zhangzhou (CN); Jie Zhu, Zhangzhou (CN); Xiangyu Yan, Zhangzhou (CN); Shixiang Zuo, Zhangzhou (CN); Chao Yao, Zhangzhou (CN); Wenjie Liu, Zhangzhou (CN); Huihui Mao, Zhangzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 177 days.

(21) Appl. No.: 17/295,458

(22) PCT Filed: Nov. 10, 2020

(86) PCT No.: PCT/CN2020/127697
§ 371 (c)(1),
(2) Date: May 20, 2021

(87) PCT Pub. No.: WO2021/238083
PCT Pub. Date: Dec. 2, 2021

(65) Prior Publication Data
US 2022/0305475 A1 Sep. 29, 2022

(30) Foreign Application Priority Data
May 27, 2020 (CN) .......................... 202010459944.0

(51) Int. Cl.
*B01J 35/00* (2006.01)
*B01J 23/00* (2006.01)
(Continued)

(52) U.S. Cl.
CPC .......... *B01J 35/004* (2013.01); *B01J 23/002* (2013.01); *B01J 23/755* (2013.01); *B01J 37/10* (2013.01);
(Continued)

(58) Field of Classification Search
None
See application file for complete search history.

(56) References Cited

FOREIGN PATENT DOCUMENTS

| CN | 101847711 A | 9/2010 |
|---|---|---|
| CN | 103920459 A | 7/2014 |

(Continued)

OTHER PUBLICATIONS

CN-104998674-A—English translation (Year: 2015).*
(Continued)

*Primary Examiner* — Stefanie J Cohen
(74) *Attorney, Agent, or Firm* — Bayramoglu Law Offices LLC

(57) ABSTRACT

A method for preparing a silicate/carbon composite from attapulgite, and use of the silicate/carbon composite are disclosed. The preparation method includes: (1) with attapulgite as a raw material, preparing $SiO_2$ with a special structure; (2) dispersing the prepared $SiO_2$ in water to obtain a suspension, and subjecting the suspension to ultrasonic dispersion; dissolving a metal nitrate in the suspension, adding $NH_4Cl$, and adding ammonia water dropwise to the suspension; and adding sucrose to obtain a suspension; (3) subjecting the suspension to microwave hydrothermal reaction; after the reaction is completed, centrifuging a resulting system; and separating a resulting solid; and (4) subjecting the solid to high-temperature calcination in a muffle furnace, and grinding a resulting product to obtain the silicate/carbon composite, which can be used in photocatalytic ammonia synthesis.

8 Claims, 1 Drawing Sheet

(51) Int. Cl.
B01J 23/755 (2006.01)
B01J 37/10 (2006.01)
B01J 37/34 (2006.01)
C01C 1/04 (2006.01)

(52) U.S. Cl.
CPC .......... B01J 37/346 (2013.01); C01C 1/0411 (2013.01); *B01J 2523/842* (2013.01); *B01J 2523/845* (2013.01); *B01J 2523/847* (2013.01)

(56) References Cited

FOREIGN PATENT DOCUMENTS

| CN | 104998674 A | * | 10/2015 |
| CN | 111164803 A | | 5/2020 |
| CN | 111569879 A | | 8/2020 |
| WO | 2019243614 A1 | | 12/2019 |

OTHER PUBLICATIONS

Qingtang Zhang, et al., Design and practice of comprehensive experimental teaching on preparation and lithium storage performance of Fe2SiO4/C nanocomposites, Experimental Technology and Management, 2020, pp. 64-66,76, vol. 37 No.2.

Qingtang Zhang, et al., Synthesis of Mesoporous Fe2SiO4/C Nanocomposites and Evaluation of Their Performance as Materials for Lithium-Ion Battery Anodes, ChemistrySelect, 2018, pp. 11902-11907, 3.

Wen-Bo Wang, et al., Hydrothermal Synthesis of Mesoporous Silicate Adsorbents from Natural Low-grade Attapulgite Clay, Bulletin of the Chinese Ceramic Society, 2017, pp. 2379-2386, vol. 36 No. 7.

* cited by examiner

METHOD FOR PREPARING SILICATE/CARBON COMPOSITE FROM ATTAPULGITE, AND USE OF SILICATE/CARBON COMPOSITE

CROSS REFERENCE TO THE RELATED APPLICATIONS

This application is the national phase entry of International Application No. PCT/CN2020/127697, filed on Nov. 10, 2020, which is based upon and claims priority to Chinese Patent Application No. 202010459944.0, filed on May 27, 2020, the entire contents of which are incorporated herein by reference.

TECHNICAL FIELD

The present disclosure belongs to the technical fields of novel material preparation and photocatalytic ammonia synthesis, and specifically relates to a method for preparing a silicate/carbon composite from attapulgite, and use of the silicate/carbon composite.

BACKGROUND

In recent years, as a classic reaction for ammonia synthesis in the field of catalysis, the Haber-Bosch process has been widely used in industrial ammonia synthesis. However, this reaction needs to be conducted at a high temperature and a high pressure, therefore the process consumes a large amount of energy. Due to the growing energy shortage, it is urgent to find a new method for ammonia synthesis. The photocatalytic ammonia synthesis reaction has received widespread attention in recent years, which has the following mechanism: nitrogen is converted into ammonia with the action of a catalyst under sunlight. However, at present, photocatalysts mostly require a method such as precious metal deposition or rare earth ion doping to improve their nitrogen fixation effects, which is costly. In addition, some catalysts such as $TiO_2$ are prone to agglomeration themselves, which seriously compromises their photocatalytic performance.

As a natural mineral clay material, attapulgite has abundant reserves in China. Due to excellent dispersibility, large specific surface area (SSA), and unique one-dimensional (1D) nanorod-like structure, attapulgite can serve as an excellent catalyst carrier. Modification of attapulgite can significantly change its physical and chemical properties, such as acidification, alkalization, and ion exchange. In addition, because attapulgite is rich in $SiO_2$, a $SiO_2$ raw material can be prepared by completely destroying the octahedral structure of attapulgite, without changing the original rod-like structure. Metal silicates can be prepared from silicon oxide and are often used in the processing and manufacturing of cement and glass. In recent years, studies have shown that $SiO_4$ tetrahedrons in transition metal silicates are easily twisted and polarized, which strengthens the migration of photogenerated carriers. In addition, due to low cost and abundant reserves, silicate-based photocatalysts have broad prospects. Since a single-metal silicate is prone to photogenerated electron-hole recombination after being excited by light and a carbon material (such as graphite), and has strong electron transport capability. Therefore, the combination of a carbon material and a metal silicate can significantly increase the photogenerated electron-hole separation efficiency.

SUMMARY

The present disclosure is intended to provide a preparation method and use of a catalyst for photocatalytic ammonia synthesis, which has low cost, easily-available raw materials, and high photogenerated electron-hole separation efficiency. The preparation method involves simple operations, mild synthesis conditions, and no complex and expensive equipment, which is conducive to large-scale popularization.

The silicate/carbon composite provided in the present disclosure has a general formula: $xMSiO_4/C$, where a molar ratio of $MSiO_4$ to C is x, and a range of x is 0.1 to 0.3. In addition, a sample not supporting a carbon material is expressed as $MSiO_4$, where the metal M is one from the group consisting of Fe, Co, and Ni.

A technical solution of the present disclosure is a preparation method of the silicate/carbon composite, including the following steps:

(1) Attapulgite is mixed with ammonium sulfate in a ceramic crucible at a mass ratio of 1:1 to 1:5, and then the crucible is put in a muffle furnace and heated to 500° C. at a rate of 2° C./min and then naturally cooled to room temperature; a calcination product is dispersed in a 2 mol/L hydrochloric acid solution at a solid-to-liquid ratio of 1:20, and water bath heating reaction under stirring is conducted at 80° C. for 6 h; and a resulting solid is separated, washed, and dried to obtain white $SiO_2$.

In the present disclosure, the attapulgite is used as a raw material to prepare $SiO_2$. After the above-mentioned series of treatments, it is found that the obtained $SiO_2$ still retains the rod-like structure of the attapulgite and has a large number of active sites for $N_2$ molecule adsorption reaction on the surface. However, commercially-available $SiO_2$ products are mostly microspheres with a smooth surface in morphology, which cannot achieve the application effect of the $SiO_2$ converted from attapulgite in the present disclosure.

Also, the addition of the rod-like silicon oxide carrier plays an important role in this application. If the silicon oxide carrier is not added, $Co(NO_3)_2 \cdot 6H_2O$ is easily converted into CoO in a hydrothermal environment, and because CoO nanoparticles are easy to agglomerate on the surface of a carbon layer at a high temperature, an obtained composite catalyst may fail to achieve an ideal nitrogen fixation effect. The rod-like silicate produced in the present disclosure can well overcome this problem, and the abundant active sites on the rod-like silicate surface can also effectively promote the progress of the reaction.

(2) The prepared $SiO_2$ is dispersed in water to obtain a $SiO_2$ suspension, and the suspension is subjected to ultrasonic dispersion for 30 min; then 10 mmol to 30 mmol of a metal nitrate is dissolved in the above suspension, 20 mmol of $NH_4Cl$ is added to the suspension, 1 mL of 28% ammonia water is added dropwise to the suspension, and a resulting mixture is stirred for 10 min; and sucrose is then added to obtain a mixture suspension.

A mass ratio of $SiO_2$ to a nickel nitrate hydrate may be 1:9.7;

a mass ratio of $SiO_2$ to a cobalt nitrate hydrate may be 1:9.7;

a mass ratio of $SiO_2$ to an iron nitrate hydrate may be 1:6.73; and a mass ratio of $SiO_2$ to $NH_4Cl$ may be 1:(1.18-3.56).

The present disclosure uses sucrose as a carbon source, which is inexpensive, easily-available, harmless to the human body, and an obtained carbon carrier has high electric conductivity which can quickly separate the electron-hole pairs generated due to photoexcitation such that the nitrogen fixation reaction continuously goes on. Compared with other carriers, carbon carriers can achieve better effects in nitrogen fixation.

(3) The suspension obtained above is transferred to a polytetrafluoroethylene (PTFE) hydrothermal reactor, and microwave reaction is conducted at 120° C. to 200° C. for 2 h; a resulting mixture is naturally cooled to room temperature and centrifuged; and a resulting solid is separated, washed, and dried.

The present disclosure adopts the microwave hydrothermal process. Under a high-frequency energy field, molecular motion changes from the original disorderly state to the orderly high-frequency vibration, such that the heating is conducted more uniformly. Because a carbon nano-lamella is a single layer structure that has a nano-sized thickness and is more stable than carbon black spherical particles, small structural units forming carbon black primary particles can self-assemble to form a more stable new carbon nano-lamella structure under the condition.

The synthesis of cobalt silicate heavily depends on the alkaline environment provided by $NHCl_4$ and ammonia water. The Si—O—H structure is converted into Si—O$^-$, which binds to $Co^{2+}$ in the solution to form cobalt silicate. As the formed $SiO_2$ still retains the original rod-like morphology of the attapulgite and can play a template-directing role, a rod-like silicate is obtained.

(4) The solid obtained above is subjected to thermal treatment at 500° C. for 2 h in a muffle furnace, and a resulting product is ground to obtain the silicate/carbon composite.

The prepared silicate/carbon composite is used in ammonia synthesis as a photocatalyst.

Advantages of the present disclosure: Natural attapulgite abundant in the nature is selected as a raw material and metal elements of Fe, Co, and Ni are introduced to synthesize a new silicate/carbon composite photocatalyst by microwave hydrothermal reaction, which has a stable structure, high photogenerated electron-hole separation efficiency, and a prominent photocatalytic effect on photocatalytic ammonia synthesis. Moreover, the preparation method has advantages such as rich raw material sources, low cost, environmental friendliness, and simple preparation process, which is conducive to large-scale popularization.

DETAILED DESCRIPTION OF THE EMBODIMENTS

In the examples, the optimal formula and process are taken as an example to illustrate the content of the present disclosure in further detail. If specific conditions are not indicated therein, conventional conditions should be adopted. All of the used raw materials, reagents, or instruments which are not specified with manufacturers are conventional commercially-available products.

Example 1

(1) Attapulgite was mixed with ammonium sulfate in a ceramic crucible at a mass ratio of 1:1, and then the crucible was put in a muffle furnace and heated to 500° C. at a rate of 2° C./min, then kept at the temperature for 2 h, and naturally cooled to room temperature; a calcination product was dispersed in a 2 mol/L hydrochloric acid solution at a solid-to-liquid ratio of 1:20, and water bath heating reaction under stirring was conducted at 80° C. for 6 h; and a resulting solid was separated, washed, and dried to obtain white $SiO_2$.

(2) 0.3 g of the prepared $SiO_2$ was dispersed in water to obtain a $SiO_2$ suspension, and the suspension was subjected to ultrasonic dispersion for 30 min; then 10 mmol of $Co(NO_3)_2 \cdot 6H_2O$ was dissolved in the above suspension, 20 mmol of $NH_4Cl$ was added to the suspension, 1 mL of 28% ammonia water was added dropwise to the suspension, and a resulting mixture was stirred for 10 min; and 1.43 g of sucrose was then added to obtain a mixture suspension.

(3) The suspension obtained above was transferred to a 100 mL PTFE hydrothermal reactor, and microwave reaction was conducted at 120° C. for 2 h; a resulting mixture was naturally cooled to room temperature and centrifuged; and a resulting solid was separated, washed, and dried.

(4) The solid obtained above was subjected to thermal treatment at 500° C. for 2 h in a muffle furnace, and a resulting product was ground to obtain a silicate/carbon composite ($0.1Co_2SiO_4/C$).

The $0.1Co_2SiO_4/C$ composite material prepared in this example was subjected to X-ray powder diffraction test, and the morphology and structure of the material were observed under a TEM.

Figure 1:
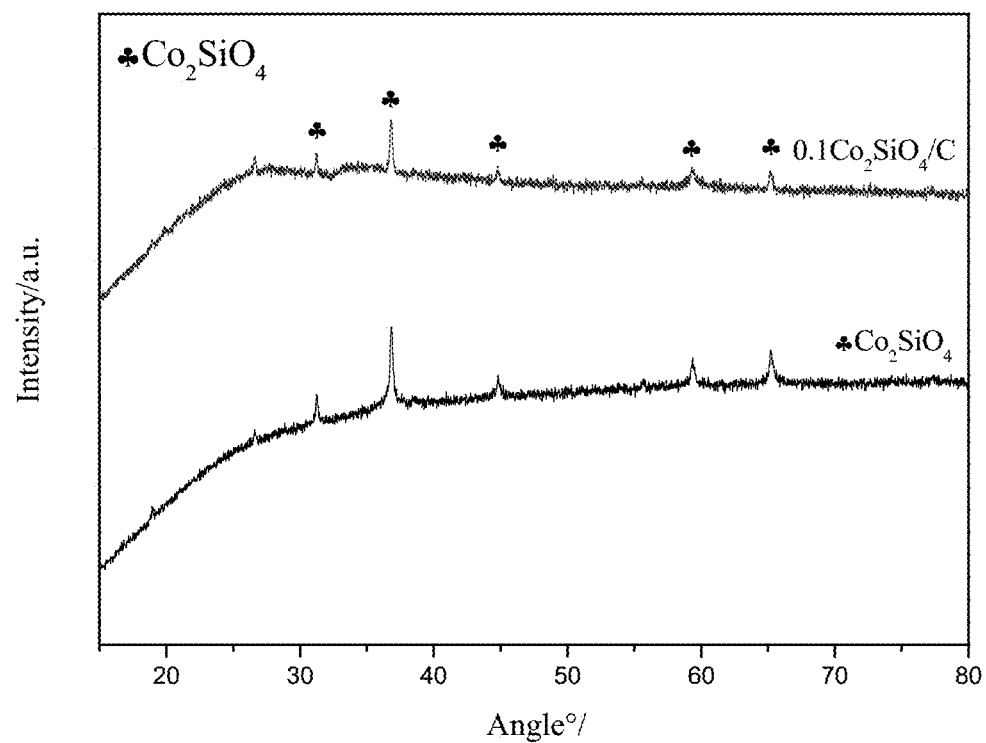
FIG. 1 shows X-ray diffraction (XRD) patterns of $0.1Co_2SiO_4/C$ prepared in Example 1 and $Co_2SiO_4$ prepared in Comparative Example 1.

An XRD pattern is shown in FIG. 1. With reference to the PDF card of $Co_2SiO_4$, it can be known that the unique diffraction peaks of $Co_2SiO_4$ appear at angles°=31.2°, 36.7°, 59.3°, 65.1°, etc. Because the carbon in the composite material is in an amorphous state, no corresponding characteristic diffraction peak can be seen in the XRD pattern. Moreover, in combination with the TEM image in FIG. 2, it can be proved that the $Co_2SiO_4$ nanorods are successfully loaded on the surface of the carbon layer.

Figure 2:
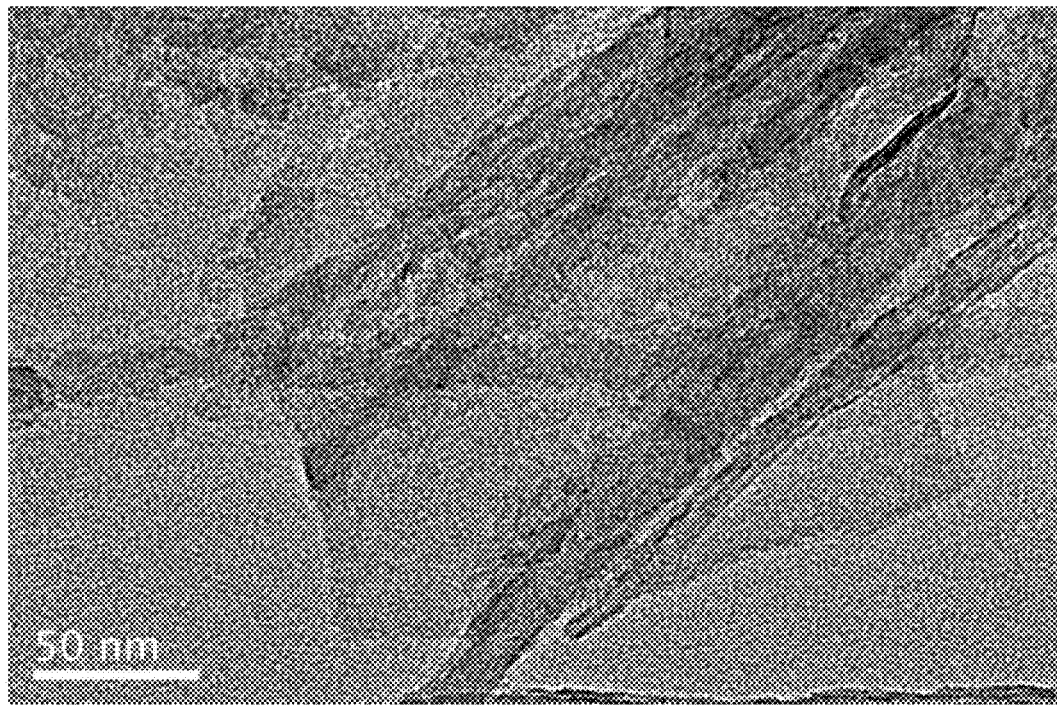
FIG. 2 is a transmission electron microscopy (TEM) image of the $0.1Co_2SiO_4/C$ sample prepared in Example 1 at a scale of 100 nm.

A TEM image is shown in FIG. 2. It can be seen from the figure that the surface of the carbon layer is uniformly loaded with $Co_2SiO_4$ nanorods, and the nanorods are uniform in size and have a length of less than 100 nm, which is consistent with the XRD result.

The present disclosure also provides use of the above composite material in photocatalytic ammonia synthesis as a photocatalyst.

A use method was as follows: 0.04 g of the prepared silicate/carbon composite material ($Co_2SiO_4/C$) was weighed and dissolved in 100 mL of deionized water, and a resulting solution was added to a photocatalytic reaction device; then $N_2$ was introduced into the reaction device at a flow rate of 60 mL/min; after the $N_2$ was introduced for 30 min, a 300 W xenon lamp was used as a simulated light source to irradiate; and 10 mL of a sample was collected every 30 min. A Nessler's reagent was added to the sample, and after reaction was completed, a supernatant was collected, and the absorbance was determined with an ultravoilet spectrometer (UVS) at a wavelength of 420 nm.

As measured by the above method, the $0.1Co_2SiO_4/C$ led to a $NH_4^+$ concentration of 0.045 g/L at 120 min. When $Co_2SiO_4$ had a loading ratio of 0.2, the sample led to a $NH_4^+$ concentration of 0.05 g/L at 120 min, in which case the composite material shows the optimal nitrogen fixation effect. In addition, pure $Co_2SiO_4$ (Comparative Example 1) is prone to agglomeration in water, and its nitrogen fixation efficiency gradually decreases after a period of reaction. However, the $Co_2SiO_4/C$ loaded with a carbon layer mate-

Example 2

(1) A attapulgite powder was mixed with ammonium sulfate in a ceramic crucible at a mass ratio of 1:2, and then the crucible was put in a muffle furnace and heated to 500° C. at a rate of 2° C./min, then kept at the temperature for 2 h, and naturally cooled to room temperature; a calcination product was dispersed in a 2 mol/L hydrochloric acid solution at a solid-to-liquid ratio of 1:20, and water bath heating reaction under stirring was conducted at 80° C. for 6 h; and a resulting solid was separated, washed, and dried to obtain a white $SiO_2$ powder.

(2) 0.6 g of the prepared $SiO_2$ powder was dispersed in water to obtain a $SiO_2$ suspension, and the suspension was subjected to ultrasonic dispersion for 30 min; then 20 mmol of $Co(NO_3)_2 \cdot 6H_2O$ was dissolved in the above suspension, 20 mmol of $NH_4Cl$ was added to the suspension, 1 mL of 28% ammonia water was added dropwise to the suspension, and a resulting mixture was stirred for 10 min; and 1.43 g of sucrose was then added to obtain a mixture suspension.

(3) The suspension obtained above was transferred to a 100 mL PTFE hydrothermal reactor, and microwave reaction was conducted at 140° C. for 2 h; a resulting mixture was naturally cooled to room temperature and centrifuged; and a resulting solid was separated, washed, and dried.

(4) The solid obtained above was subjected to thermal treatment at 500° C. for 2 h in a muffle furnace, and a resulting product was ground into powder to obtain a silicate/carbon composite ($0.2Co_2SiO_4/C$).

Subsequent detection was conducted with reference to Example 1. The $NH_4^+$ concentration reached 0.05 g/L at 120 min.

Example 3

(1) A attapulgite powder was mixed with ammonium sulfate in a ceramic crucible at a mass ratio of 1:3, and then the crucible was put in a muffle furnace and heated to 500° C. at a rate of 2° C./min, then kept at the temperature for 2 h, and naturally cooled to room temperature; a calcination product was dispersed in a 2 mol/L hydrochloric acid solution at a solid-to-liquid ratio of 1:20, and water bath heating reaction under stirring was conducted at 80° C. for 6 h; and a resulting solid was separated, washed, and dried to obtain a white $SiO_2$ powder.

(2) 0.9 g of the prepared $SiO_2$ powder was dispersed in water to obtain a $SiO_2$ suspension, and the suspension was subjected to ultrasonic dispersion for 30 min; then 30 mmol of $Co(NO_3)_2 \cdot 6H_2O$ was dissolved in the above suspension, 20 mmol of $NH_4Cl$ was added to the suspension, 1 mL of 28% ammonia water was added dropwise to the suspension, and a resulting mixture was stirred for 10 min; and 1.43 g of sucrose was then added to obtain a mixture suspension.

(3) The suspension obtained above was transferred to a 100 mL PTFE hydrothermal reactor, and microwave reaction was conducted at 160° C. for 2 h; a resulting mixture was naturally cooled to room temperature and centrifuged; and a resulting solid was separated, washed, and dried.

(4) The solid obtained above was subjected to thermal treatment at 500° C. for 2 h in a muffle furnace, and a resulting product was ground into powder to obtain a silicate/carbon composite ($0.3Co_2SiO_4/C$).

Subsequent detection was conducted with reference to Example 1. The $NH_4^+$ concentration reached 0.042 g/L at 120 min.

Example 4

(1) A attapulgite powder was mixed with ammonium sulfate in a ceramic crucible at a mass ratio of 1:4, and then the crucible was put in a muffle furnace and heated to 500° C. at a rate of 2° C./min, then kept at the temperature for 2 h, and naturally cooled to room temperature; a calcination product was dispersed in a 2 mol/L hydrochloric acid solution at a solid-to-liquid ratio of 1:20, and water bath heating reaction under stirring was conducted at 80° C. for 6 h; and a resulting solid was separated, washed, and dried to obtain a white $SiO_2$ powder.

(2) 0.6 g of the prepared $SiO_2$ powder was dispersed in water to obtain a $SiO_2$ suspension, and the suspension was subjected to ultrasonic dispersion for 30 min; then 10 mmol of $Fe(NO_3)_3 \cdot 9H_2O$ was dissolved in the above suspension, 20 mmol of $NH_4Cl$ was added to the suspension, 1 mL of 28% ammonia water was added dropwise to the suspension, and a resulting mixture was stirred for 10 min; and 1.43 g of sucrose was then added to obtain a mixture suspension.

(3) The suspension obtained above was transferred to a 100 mL PTFE hydrothermal reactor, and microwave reaction was conducted at 180° C. for 2 h; a resulting mixture was naturally cooled to room temperature and centrifuged; and a resulting solid was separated, washed, and dried.

(4) The solid obtained above was subjected to thermal treatment at 500° C. for 2 h in a muffle furnace, and a resulting product was ground into powder to obtain a silicate/carbon composite ($0.1FeSiO_3/C$).

Subsequent detection was conducted with reference to Example 1. The $NH_4^+$ concentration reached 0.036 g/L at 20 min.

Example 5

(1) A attapulgite powder was mixed with ammonium sulfate in a ceramic crucible at a mass ratio of 1:5, and then the crucible was put in a muffle furnace and heated to 500° C. at a rate of 2° C./min, then kept at the temperature for 2 h, and naturally cooled to room temperature; a calcination product was dispersed in a 2 mol/L hydrochloric acid solution at a solid-to-liquid ratio of 1:20, and water bath heating reaction under stirring was conducted at 80° C. for 6 h; and a resulting solid was separated, washed, and dried to obtain a white $SiO_2$ powder.

(2) 0.3 g of the prepared $SiO_2$ powder was dispersed in water to obtain a $SiO_2$ suspension, and the suspension was subjected to ultrasonic dispersion for 30 min; then 10 mmol of $Ni(NO_3)_2 \cdot 6H_2O$ was dissolved in the above suspension, 20 mmol of $NH_4Cl$ was added to the suspension, 1 mL of 28% ammonia water was added dropwise to the suspension, and a resulting mixture was stirred for 10 min; and 1.43 g of sucrose was then added to obtain a mixture suspension.

(3) The suspension obtained above was transferred to a 100 mL PTFE hydrothermal reactor, and microwave reaction was conducted at 200° C. for 2 h; a resulting mixture was naturally cooled to room temperature and centrifuged; and a resulting solid was separated, washed, and dried.

(4) The solid obtained above was subjected to thermal treatment at 500° C. for 2 h in a muffle furnace, and a resulting product was ground into powder to obtain a silicate/carbon composite ($0.1Ni_2SiO_4/C$).

Subsequent detection was conducted with reference to Example 1. The $NH_4^+$ concentration reached 0.03 g/L at 120 min.

Comparative Example 1

The operations in Comparative Example 1 were the same as that in Example 1 except that no sucrose was added in step (2), so a product did not include a carbon carrier.

(1) Attapulgite was mixed with ammonium sulfate in a ceramic crucible at a mass ratio of 1:1, and then the crucible was put in a muffle furnace and heated to 500° C. at a rate of 2° C./min, then kept at the temperature for 2 h, and naturally cooled to room temperature; a calcination product was dispersed in a 2 mol/L hydrochloric acid solution at a solid-to-liquid ratio of 1:20, and water bath heating reaction under stirring was conducted at 80° C. for 6 h; and a resulting solid was separated, washed, and dried to obtain white $SiO_2$.

(2) 0.3 g of the prepared $SiO_2$ was dispersed in water to obtain a $SiO_2$ suspension, and the suspension was subjected to ultrasonic dispersion for 30 min; then 10 mmol of $Co(NO_3)_2 \cdot 6H_2O$ was dissolved in the above suspension, 20 mmol of $NH_4Cl$ was added to the suspension, 1 mL of 28% ammonia water was added dropwise to the suspension, and a resulting mixture was stirred for 10 min to obtain a mixture suspension.

(3) The suspension obtained above was transferred to a 100 mL PTFE hydrothermal reactor, and microwave reaction was conducted at 120° C. for 2 h; a resulting mixture was naturally cooled to room temperature and centrifuged; and a resulting solid was separated, washed, and dried.

(4) The solid obtained above was subjected to thermal treatment at 500° C. for 2 h in a muffle furnace, and a resulting product was ground into powder to obtain a silicate material ($Co_2SiO_4$).

Subsequent detection was conducted with reference to Example 1. The $NH_4$ concentration only reached 0.015 g/L at 120 min.

Comparative Example 2

The operations in Comparative Example 2 were the same as that in Example 1 except that a conventional commercially-available $SiO_2$ powder was used.

(1) 0.3 g of the commercially-available $SiO_2$ powder was dispersed in water to obtain a $SiO_2$ suspension, and the suspension was subjected to ultrasonic dispersion for 30 min; then 10 mmol of $Co(NO_3)_2 \cdot 6H_2O$ was dissolved in the above suspension, 20 mmol of $NH_4Cl$ was added to the suspension, 1 mL of 28% ammonia water was added dropwise to the suspension, and a resulting mixture was stirred for 10 min; and 1.43 g of sucrose was then added to obtain a mixture suspension.

(2) The suspension obtained above was transferred to a 100 mL PTFE hydrothermal reactor, and microwave reaction was conducted at 120° C. for 2 h; a resulting mixture was naturally cooled to room temperature and centrifuged; and a resulting solid was separated, washed, and dried.

(3) The solid obtained above was subjected to thermal treatment at 500° C. for 2 h in a muffle furnace, and a resulting product was ground into powder to obtain a silicate/carbon composite ($0.1Co_2SiO_4/C$).

Subsequent detection was conducted with reference to Example 1. The $NH_4^+$ concentration only reached 0.005 g/L at 120 min.

What is claimed is:

1. A method for preparing a silicate/carbon composite from attapulgite, wherein the silicate/carbon composite has a general formula: $xMSiO_4/C$, wherein a molar ratio of $MSiO_4$ to C is x, and a range of the x is 0.1 to 0.3, and a metal M is one selected from the group consisting of Fe, Co, and Ni; and the method for preparing the silicate/carbon composite comprises the following steps:

(1) mixing an attapulgite powder with ammonium sulfate in a ceramic crucible to obtain a first resulting mixture, putting the ceramic crucible in a muffle furnace, and heating and calcining the first resulting mixture to obtain a calcination product; after a calcination, naturally cooling the calcination product to room temperature; dispersing the calcination product in a hydrochloric acid solution to obtain a second resulting mixture, and conducting a water bath heating reaction on the second resulting mixture under a stirring to obtain a first resulting solid; and separating, washing, and drying the first resulting solid to obtain $SiO_2$ with a special structure;

(2) dispersing the $SiO_2$ prepared in step (1) in water to form a $SiO_2$ suspension, and subjecting the $SiO_2$ suspension to an ultrasonic dispersion; dissolving a metal nitrate in the $SiO_2$ suspension, adding $NH_4Cl$, and adding ammonia water dropwise to the $SiO_2$ suspension to obtain a third resulting mixture; and after the third resulting mixture is stirred, adding sucrose to the third resulting mixture to obtain a mixture suspension;

(3) transferring the mixture suspension obtained above to a polytetrafluoroethylene (PTFE) hydrothermal reactor, and conducting a microwave reaction on the mixture suspension at 120° C. to 200° C. for 2 h to obtain a fourth resulting mixture; naturally cooling the fourth resulting mixture to room temperature, and centrifuging the fourth resulting mixture to obtain a second resulting solid; and separating, washing, and drying the second resulting solid; and (4) subjecting the second resulting solid obtained from the drying to a thermal treatment at 500° C. in the muffle furnace to obtain a resulting product, and grinding the resulting product into a powder to obtain the silicate/carbon composite ($xMSiO_4/C$).

2. The method for preparing the silicate/carbon composite from the attapulgite according to claim 1, wherein in step (1), the attapulgite powder and the ammonium sulfate are mixed at a mass ratio of 1:1 to 1:5.

3. The method for preparing the silicate/carbon composite from the attapulgite according to claim 1, wherein the heating and calcining is conducted as follows: heating the first resulting mixture to 500° C. at a rate of 2° C./min and calcining the first resulting mixture at 500° C.; and the water bath heating reaction under the stirring is conducted at 80° C. for 6 h.

4. The method for preparing the silicate/carbon composite from the attapulgite according to claim 1, wherein the water bath heating reaction under the stirring in step (1) is conducted at 80° C. for 6 h.

5. A method of using the silicate/carbon composite prepared by the method according to claim 1, comprising using the silicate/carbon composite in an ammonia synthesis as a photocatalyst.

6. The method of using according to claim 5, wherein in step (1), the attapulgite powder and the ammonium sulfate are mixed at a mass ratio of 1:1 to 1:5.

7. The method of using according to claim 5, wherein the heating and calcining is conducted as follows: heating the first resulting mixture to 500° C. at a rate of 2° C./min and calcining the first resulting mixture at 500° C.; and the water bath heating reaction under the stirring is conducted at 80° C. for 6 h.

8. The method of using according to claim 5, wherein the water bath heating reaction under the stirring in step (1) 1s conducted at 80° C. for 6 h.

* * * * *